United States Patent
Euscher

(10) Patent No.: US 6,317,424 B1
(45) Date of Patent: *Nov. 13, 2001

(54) ANTENNA DIVERSITY RADIO RECEIVING ARRANGEMENT FOR TELECOMMUNICATIONS SYSTEMS USING BLOCK-ORIENTED TRANSMISSION OF RADIO MESSAGES

(75) Inventor: Christoph Euscher, Rhede (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/750,895

(22) PCT Filed: Jun. 21, 1995

(86) PCT No.: PCT/DE95/00803

§ 371 Date: Dec. 19, 1996

§ 102(e) Date: Dec. 19, 1996

(87) PCT Pub. No.: WO95/35600

PCT Pub. Date: Dec. 28, 1995

(30) Foreign Application Priority Data

Jun. 21, 1994 (DE) .................................................. 44 21 643

(51) Int. Cl.[7] .................................................. H04J 3/06
(52) U.S. Cl. .................................................. 370/350
(58) Field of Search .................. 451/277.1, 277.2, 451/271, 272, 278.1, 279.1, 54.1, 38.3; 375/267, 347, 349, 259, 260; 370/252, 347, 342, 350, 320, 321, 335, 337, 441, 442, 498, 522, 509, 503, 511, 310; 455/562

(56) References Cited

U.S. PATENT DOCUMENTS

| | | |
|---|---|---|
| 5,241,701 | 8/1993 | Andoh . |
| 5,325,088 * | 6/1994 | Willard et al. ........................ 370/313 |
| 5,369,081 * | 11/1994 | Smith ............................... 455/277.1 |

(List continued on next page.)

FOREIGN PATENT DOCUMENTS

| | | |
|---|---|---|
| 41 19 398 A1 | 2/1992 | (DE) . |
| 42 28 840 C1 | 12/1993 | (DE) . |
| 0 440 239 A2 | 8/1991 | (EP) . |

(List continued on next page.)

OTHER PUBLICATIONS

ETSI–ETS 300 175 Oct. 1, 1992—European Telecommunications Standard Institute 1992—Radio Equipment and Systems (RES); Digital European Cordless Telecommunications (DECT) Common interface.
ICC.91—IEEE Communications Society and the Denver IEEE Section—Jun. 23–26, 1991—Sheraton—Denver Technological Center—vol. 3 of 3.
Patent Abstracts of Japan JP62047222—E527 28–07–87.

*Primary Examiner*—Huy D. Vu
(74) *Attorney, Agent, or Firm*—Schiff Hardin & Waite

(57) ABSTRACT

In an antenna diversity base station of a DECT cordless telephone, at least one antenna change is carried out, for example on the basis of field strength measurements (FSM1, FSM2), in order to improve the "antenna diversity" during the reception of a DECT radio message, for example of a synchronization initiation word (E-SEW) of a synchronization field (SYF) to the DECT standard. As a result of the fact that the antenna change takes place during the reception of the synchronization initiation word (E-SEW), both optimum "antenna diversity" and interference-free transmission of wanted information contained in the radio message are possible in each transmission time slot of the DECT radio message.

12 Claims, 6 Drawing Sheets

U.S. PATENT DOCUMENTS

| | | | | |
|---|---|---|---|---|
| 5,371,737 | * | 12/1994 | Nelson et al. | 370/509 |
| 5,499,397 | * | 3/1996 | Wadin et al. | 455/277.2 |
| 5,530,926 | * | 6/1996 | Rozanski | 455/277.2 |
| 5,564,074 | * | 10/1996 | Juntti | 455/54.1 |
| 5,594,737 | * | 1/1997 | Pillekamp | 455/38.3 |
| 5,748,676 | * | 5/1998 | Mahany | 455/277.1 |

FOREIGN PATENT DOCUMENTS

| | | |
|---|---|---|
| 0 452 289 A1 | 10/1991 | (EP). |
| 0 722 234 A1 | 7/1996 | (EP). |
| 2 268 364 | 1/1994 | (GB). |
| 63-158922 | 7/1988 | (JP). |
| 3-98344 | 5/1991 | (JP). |
| WO 94/08404 | 4/1994 | (WO). |
| WO 94/10762 | 5/1994 | (WO). |
| WO 94/10764 | 5/1994 | (WO). |
| WO 94/10812 | 11/1994 | (WO). |
| WO 96/02984 * | 2/1996 | (WO). |

* cited by examiner

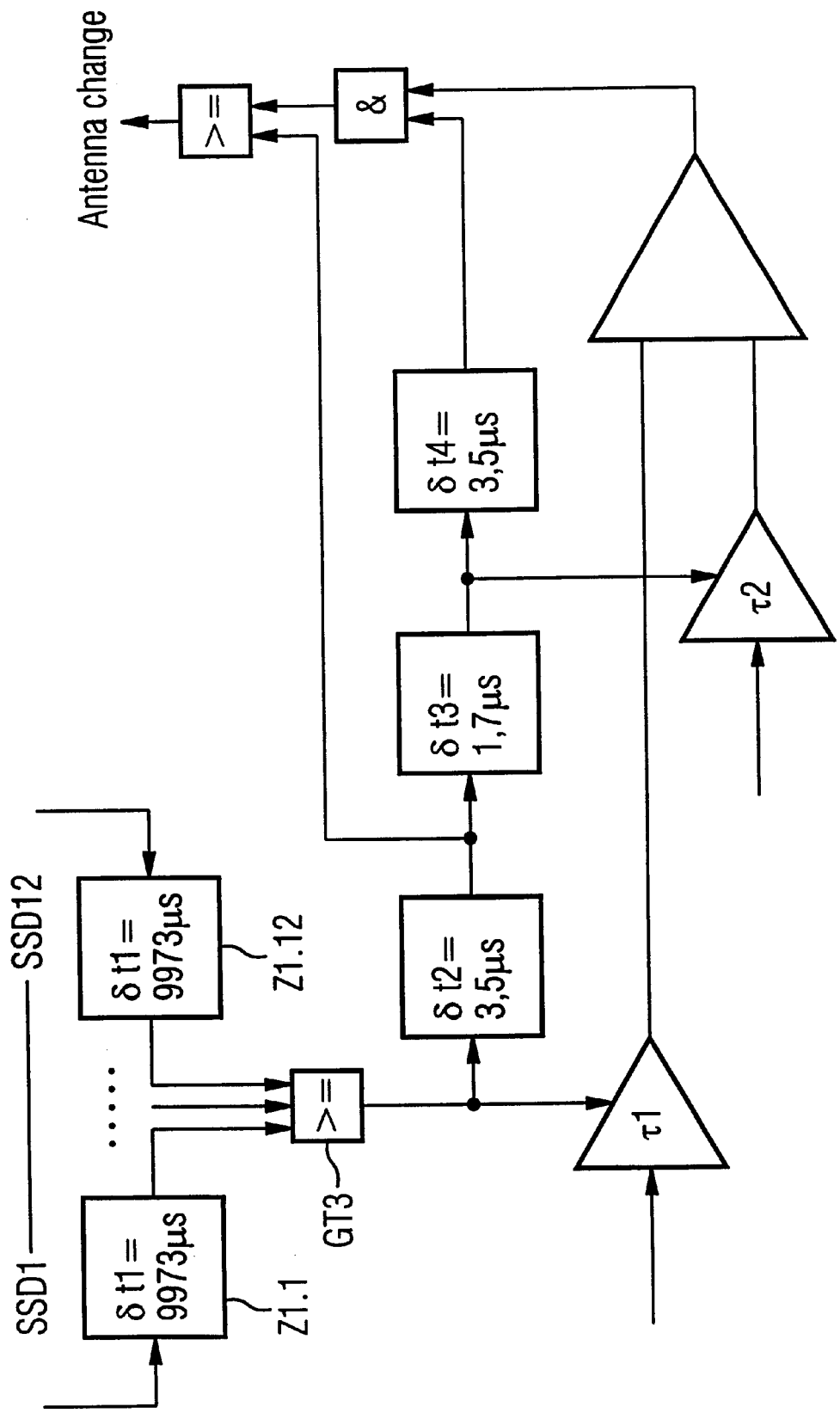

ANTENNA DIVERSITY RADIO RECEIVING ARRANGEMENT FOR TELECOMMUNICATIONS SYSTEMS USING BLOCK-ORIENTED TRANSMISSION OF RADIO MESSAGES

BACKGROUND OF THE INVENTION

The invention relates to an antenna diversity radio receiving arrangement for telecommunications systems using block-oriented transmission of radio messages.

Telecommunications systems using block-oriented transmission of radio messages are being technically developed, linked to various standards, analogous to the ISDN Standard (Integrated Services Digital Network) which has already been in existence for a relatively long time in cable-based telecommunications technology. The term "block-oriented transmission" essentially defines methods of transmitting radio messages which are transmitted using the time division multiple access method (TDMA=Time Division Multiple Access) or using the code division multiple access method (CDMA=Code Division Multiple Access). Known telecommunications systems, based on the TDMA method, are, for example, cordless telecommunications systems to the DECT Standard (Digital European Cordless Telecommunication) and mobile radio telecommunications systems to the GSM Standard (Global Systems for Mobile Communication).

A dynamic channel selection from about 120 available channels is carried out for cordless telecomunication to the DECT Standard (cf. European Telecommunication Standard -Final Draft-; prETS 300 175-1, 5/1992; ETS-Institute 06921 Sophia Antipolis, France). The 120 channels result from the fact that ten frequency bands between 1.8 and 1.9 GHz are used in the DECT Standard, a time division multiple access frame of 10 ms being used in the time division multiple access mode (TDMA=Time Division Multiple Access) in each frequency band, as illustrated in FIG. 1. 24 (from 0 to 23) time channels are defined in this time division multiple access frame and thus govern a frame layout. This frame layout is then used in such a manner that a maximum of 12 mobile sections PT (Portable Termination), which are assigned to a base station FT (Fixed Termination), of a DECT telecommunications system can operate simultaneously in the duplex mode (PT→FT and FT→PT as well as FT→PT and PT→FT) for each frequency band.

In this case, the 24 time channels are in each case assigned time slots having a time slot duration of 417 $\mu$s. The time slot in this case indicates the time in which information (data) is transmitted. This transmission of information in the duplex mode is also called the ping pong method since transmission is carried out at a specific time and reception is carried out at a different time. In this ping pong method, a burst having a time duration of 365 $\mu$s or a bit length of 420 bits with a data throughput of 42 kBit/s is transmitted in each time slot. Taking account of the fact that 30 bits are in each case available in a security time frame GS (Guard Space) at both ends of the time frame in order to avoid adjacent time slots overlapping, this results in a total data throughput of 1.152 MBit/s with respect to the time division multiple access frame. The chronological sequence of the transmitted pulses per time division multiple access frame defines, according to FIG. 2, a PH channel, the so-called physical channel, which is assigned to a so-called physical layer (PH-L). The data package of 420 bits transmitted in this case is called a PH package and is assigned to a D field. Of the 420 data bits (sequence of H/L bit values) in the PH packet, 32 bits are used for synchronization to a synchronization field SYF, and 388 bits are used for the transmission of wanted information to a wanted information field NIF.

The 32 bits in the synchronization field SYF are in turn divided into two data bit sequences of 16 bits each. The first data bit sequence (sequence with the first 16 H/L bit values) is a synchronization initiation word SEW, which is used to initiate synchronization. For a transmission direction "mobile section PT→base station FT", this synchronization initiation word SEW ideally comprises a periodic "101" or "TLH" sequence, and a likewise periodic "010" or "LEHL" sequence for the opposite transmission direction "base station FT→mobile section PT". The base station/mobile section assignments shown in brackets in FIGS. 1 and 2 are possible as alternatives depending on which sequence is assigned to which transmission direction.

The second data bit sequence (sequence with the second 16 H/L bit values) is a synchronization confirmation word SBW which must be used to confirm the synchronization initiated using the synchronization initiation word SEW. Essentially, the data bits of the synchronization confirmation word SBW must be identified with this confirmation. Only if this is the case is the synchronization initiated using the synchronization initiation word SEW accepted. The synchronization is in this case initiated if it is possible to assume, with a certain probability, that the synchronization initiation word SEW is an "HLH" or "LHL" sequence.

Furthermore, other layers are also defined in the DECT Standard, analogous to the ISDN Standard using the ISO/OSI 7-layer model. One of these layers is a medium access control layer (MAC-L) to which, according to FIG. 3, the 388 bits in the wanted information field NIF are assigned for transmission of wanted information. The wanted information field NIF is in this case composed of an A field and a B field. The A field comprises 64 bits of the 388 bits in the wanted information field NIF and these are used, inter alia, for messages when the base station is connected to the mobile sections of the DECT telecommunications system. The other 324 bits are assigned to the B field, 320 bits thereof being used for voice data and 4 bits to identify partial interference of the pulse. Finally, the 324 bits in the B field are assigned to other ISO/OSI layers in the context of the ISO/OSI 7-layer model.

In the simplest form, the DECT telecommunications system has a base station with at least one mobile section. More complex (for example network) systems contain a plurality of base stations, each having a plurality of mobile sections. On the basis of the 24 time channels defined in the DECT Standard, up to 12 mobile sections can be assigned to the base station, which communicate with the base station using the duplex mode. For the time division multiple access frame, which is likewise defined in the DECT Standard, of 10 ms, the duplex mode means that information is transmitted from the base station to the mobile section, or vice versa, every 5 ms.

When transmitting radio-frequency-modulated radio messages—for example DECT radio messages in the GHz band—, the transmission conditions frequently differ very considerably within a small physical region of a few centimeters (centimetric region) because of the propagation characteristics of the radio-frequency carrier signal. In the case of mobile systems, such as the DECT telecommunications system, this results in the transmission conditions fluctuating greatly with time even at low speeds of about 1 m/s. In order to counter at least partially these time fluctuations in the transmission conditions, it is known for a second, physically offset antenna to be installed at least at one part of the mobile system (for example the base station). Because of the physical separation, the reception conditions at the antennas differ and can be selected by antenna switching. This method, which is known by the term "antenna diversity" (cf. Proceedings of International Conference on Communications—ICC'91; Jun. 23–26, 1991, New York (US), pages 1480 to 1484 and Patent Abstracts of Japan, Vol. 11, No. 231 (E-527), Jul. 28, 1987 in conjunction with JP-A-62047222) enables improved reception of radio messages in mobile systems when the transmission conditions are poor in places. The antenna diversity method is suitable in particular for DECT telecommunications systems based on the TDMA method, in the case of which it is possible to change the antenna in the time between two time slots without this interfering with the transmitted radio message.

If, according to FIGS. 4 and 5, at least two antennas A1, A2 but only one receiver REC, which is assigned to a radio section RE, RE-T, RE-R of the antenna diversity radio receiving arrangement FT, PT, are used in an antenna diversity radio receiving arrangement FT, PT which is known from WO 94/10812 (for example a base station and/or mobile section of a cordless telephone), then, according to WO 94/10764, there is a critical problem in the control of the antenna diversity switching in that the reception conditions cannot be assessed simultaneously at the two antennas. It is therefore proposed that the reception conditions be checked once per time slot, for example by a field strength measurement and/or evaluation of transmission errors (CRC errors: Cycle Redundancy Check). These current and preceding checks, which are related to time slots, are used to decide whether the radio message transmitted In the subsequent time slot will be received on the same antenna or on a different antenna. However, since the transmission conditions can change severely in the time between two time slots, this known antenna diversity method does not guarantee that the chosen antenna offers the best possible reception at this time.

Furthermore, U.S. Pat. No. 5,241,701 discloses an antenna diversity radio receiving arrangement for telecommunications systems using block-oriented transmission of radio messages, in which the antenna diversity means assigned to the radio receiving arrangement and having two antennas assigned thereto are designed in such a manner that, during the receiving of time duration a message block (time slot) of the radio message, at least two different antennas, which are assigned to the antenna diversity means, are assigned alternately to the receiving channel of the antenna diversity radio receiving arrangement, as the receiving antenna.

SUMMARY OF THE INVENTION

International application WO 94/08404 or, respectively, U.S. Pat. No. 5,369,801 discloses an antenna diversity radio reception arrangement for telecommunication systems with a block-oriented transmission of radio messages or, respectively, an antenna selection method in an antenna diversity radio reception arrangement for telecommunication systems with a block-oriented transmission of radio messages wherein or, respectively, whereby the antenna selection occurs during the reception of synchronization bits ("MUX 2" format) exhibiting redundant data (bits) or of useful information bits configured as "low significant bits" ("MUX 1" format).

The object underlying the invention is comprised in specifying an antenna diversity radio reception arrangement for telecommunication systems with a block-oriented transmission of radio messages that, compared to known arrangements, also enables a reliable "antenna diversity" when the synchronization bits known from the prior art during whose reception the antenna selection occurs comprise no redundant data (bits).

The object underlying the invention is also comprised in specifying an antenna selection method in an antenna diversity radio reception arrangement for telecommunication systems with a block-oriented transmission of radio messages that, compared to known methods, also enables a reliable "antenna diversity" when the synchronization bits known from the prior art during whose reception the antenna selection occurs comprise no redundant data (bits).

In an antenna diversity radio reception arrangement for telecommunication systems with a block-oriented transmission of radio messages (for example an antenna diversity base station of a DECT cordless telephone, or, respectively, given an antenna selection method in an antenna diversity radio reception arrangement for telecommunication systems with a block-oriented transmission of radio messages, for example an antenna diversity base station of a DECT cordless telephone) at least one antenna change is undertaken (for example on the basis of field strength measurements) during the reception of a synchronization preamble word that contains redundant data and belongs to a synchronization field contained in a message block of a radio message (for example a DECT radio message) and composed of the synchronization preamble word and a synchronization confirmation word. It is undertaken for the improvement of the "antenna diversity" in the sense of the object underlying the invention. In that the antenna change ensues during the reception of the synchronization preamble word, both an optimum "antenna diversity" as well as a disturbance-free transmission of useful data contained in the radio message are possible in every transmission time slot of the DECT radio message.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 9 depicts an antenna selection means according to FIG. 8, wherein the individual counters relating to the mobile stations are connected to a further OR gate.

DESCRIPTION OF THE PREFERRED EMBODIMENT

Figure 2:
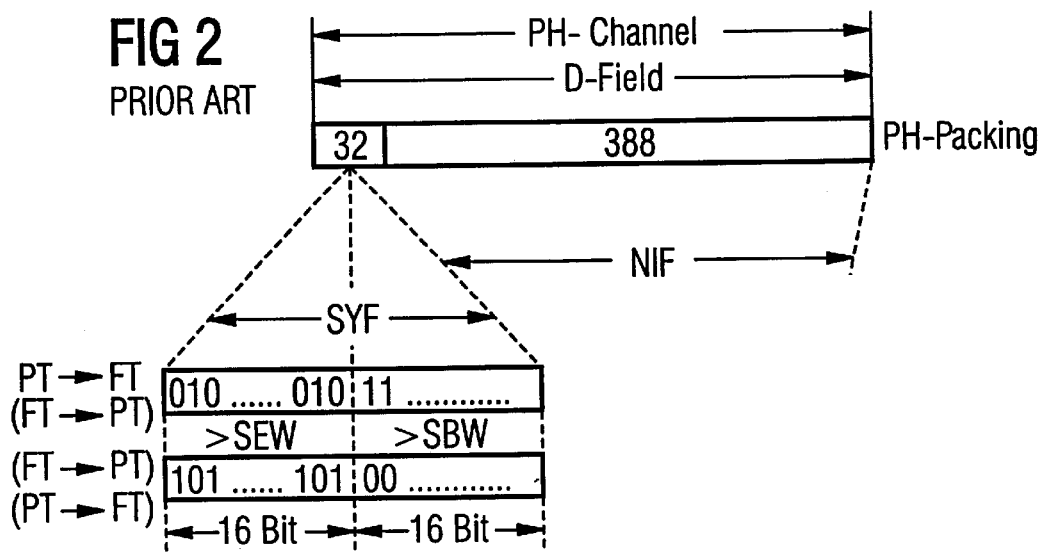
Figure 3:
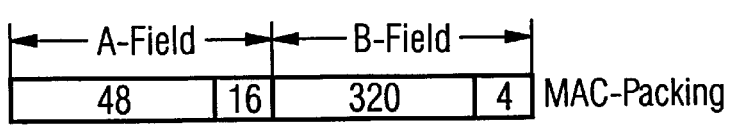
Figure 6:
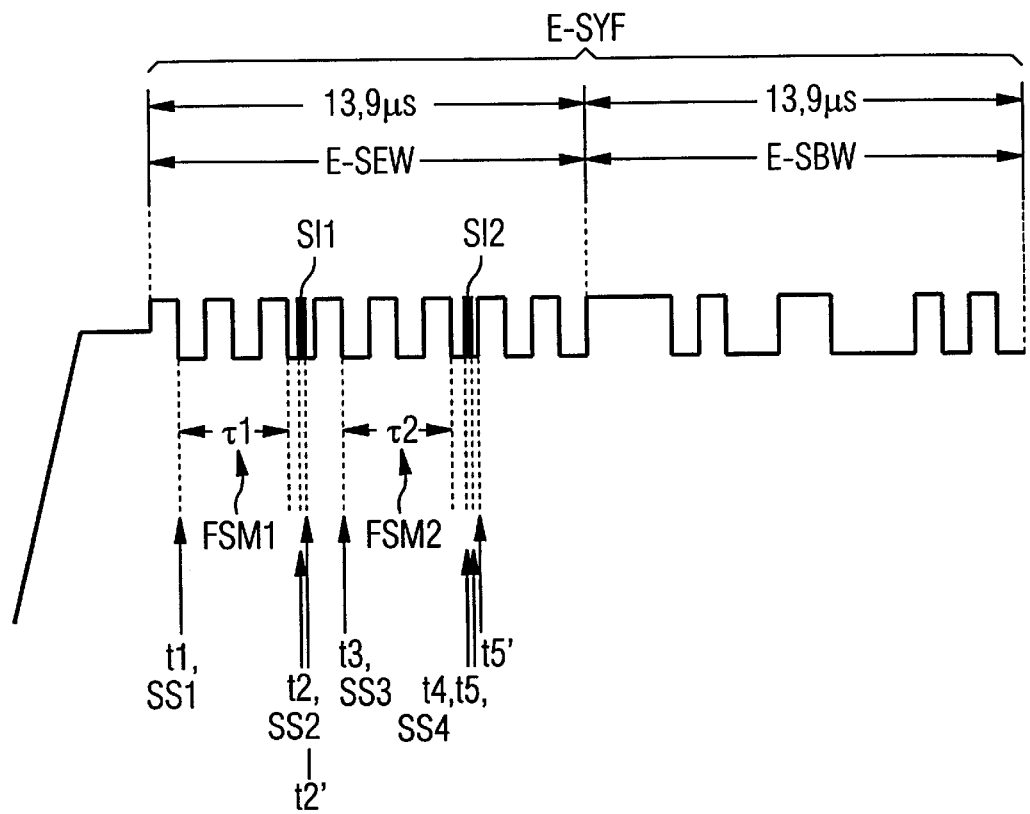
FIG. 6 shows a reception synchronization field of the base station which is subject to interference as a result of an antenna change, in the case of an antenna diversity base station of a DECT cordless telephone.

FIG. 6 shows a reception synchronization field E-SYF which is received by an antenna diversity base station of a DECT cordless. telephone, has a synchronization initiation word E-SEW at the receiving end and has a synchronization confirmation word E-SBW at the receiving end, as an analog signal which is interfered with as a result of at least one antenna change at the antenna diversity base station. The reception synchronization field E-SYF is in this case the image of a transmission synchronization field which is transmitted, for example, by a mobile section of the DECT cordless telephone, is transmitted on the radio path between the mobile section and the base station and has a synchronization initiation word at the transmission end and a synchronization confirmation word at the transmission end. The transmission synchronization field, which is 32 bits long according to the illustration in FIG. 2, is transmitted immediately after the activation of the mobile section. For the data rate of 1.152 Mbit/s stated initially, about 27.8 $\mu$s are required for the transmission mission (sending and receiving) of the transmission and of the reception synchronization field. Of this, 13.9 $\mu$s are required for the transmission of the synchronization initiation word, and 13.9 $\mu$s are likewise required for the transmission of the synchronization confirmation word.

While the synchronization initiation word E-SEW at the receiving end is used to synchronize the antenna diversity base station at bit level, the synchronization confirmation word E-SBW at the receiving end is used to synchronize the antenna diversity base station at word level. Since the synchronization initiation word at the transmission end is assigned synchronization information, which comprises an alternating "1/0" or "0/1" bit sequence, and since all that is required for bit synchronization is to identify the "1/0", or "0/1" alternation in the bit sequence, the synchronization information contained in the synchronization initiation word E-SEW at the receiving end—for interference-free transmission on the radio path—has a redundant information element. As a result of this redundancy in the synchronization information, the synchronization initiation word E-SEW at the receiving end is available as a time period for one or more antenna changes at the antenna diversity base station, for improved "antenna diversity". Therefore, the synchronization initiation word E-SEW at the receiving end is suitable for this purpose, since (1) the choice of antenna should be complete at the time of reception of the synchronization confirmation word E-SBW at the receiving end, since correct identification of the synchronization confirmation word E-SBW at the receiving end is critical to reception or loss of the information transmitted in the time slot, and (2) interference in one or a few bits in the 16-bit long synchronization initiation word E-SEW is not relevant since, from experience, even a few bits (approximately 6 bits) are sufficient to achieve bit synchronism.

The individual method steps which take place in the base station in order to carry out the antenna change, for example from a first antenna A1 to a second antenna A2, will be explained in the following text with reference to FIG. 6. For the present exemplary embodiment, the individual method steps are in this case preferably carried out every 10 $\mu$s in the time slots in which the mobile section is transmitting and the base station is receiving. This situation does not change at all even when, in the opposite case, the mobile section, or even both the mobile section and the base station, have at least two antennas and the base station is in this case transmitting while the mobile section is receiving. For this transmission/reception direction, the corresponding reception synchronization field would then—according to FIG. 2—have a bit sequence which is inverted with respect to the reception synchronization field E-SYF according to FIG. 6.

At a time t1, at which the antenna A1 is being used as a receiving antenna, a first field strength measurement FSM1 is started by a first antenna diversity control signal SS1 of the base station. The measurement in this case extends, for example, over a first measurement time period $\tau$1, in which, for example, four bits (the 2nd bit to the 5th bit of the synchronization initiation word E-SEW at the receiving end) have already been evaluated for bit synchronization. Subsequently, at a second time t2, an antenna change from the first antenna A1 to the second antenna A2 is initiated by a second antenna diversity control signal SS2 of the base station. This antenna change is completed, because of a switching-dependent changeover time (cf. FIG. 8), at a time t2'. The initiation of the antenna change at the time t2 takes place, for example, during the sixth bit (a low bit according to FIG. 6) in the synchronization initiation word E-SEW at the receiving end. The respective bit may in this case be interfered with by the antenna change. This interference is represented in FIG. 6 by a first interference pulse SI1. After the antenna change, a second field strength measurement FSM2 is started at a time t3 at the antenna A2 of the base station by a second antenna diversity control signal SS3. This second measurement FSM2 in this case extends over a second measurement time period $\tau$2, whose duration for measurement purposes corresponds, however, to that of the first measurement time period $\tau$1. If required, a further four bits (the 8th bit to the 11th bit of the synchronization initiation word E-SEW at the receiving end) have been evaluated for bit synchronization in the measurement time period $\tau$2. In order that the same ratio of low bits ("0" bits) to high bits ("1" bit) is measured in both measurement time periods, the starting times t1, t3 for the field strength measurements FSM1, FSM2 are separated in time by an even multiple of the bit transmission time. For the DECT cordless telephone, this bit transmission time is about 868 ns. The time relationship between the starting times t1, t3 is therefore important, because the first antenna diversity control signal SS1 can be generated only with limited accuracy. The reasons for this will be explained in the following text with reference to FIG. 7.

Figure 1:
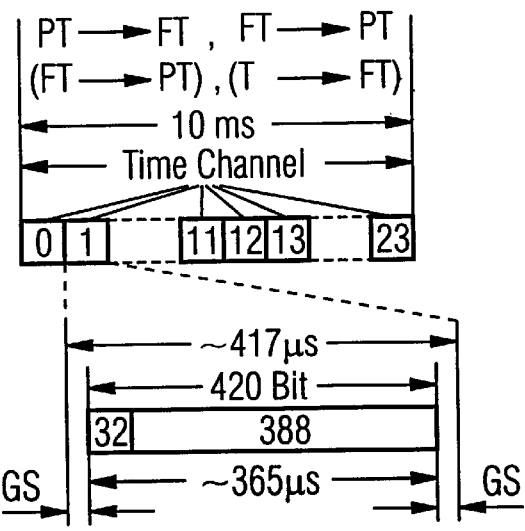
FIGS. 1–5 depict prior art antenna diversity radio receiving arrangements.
Figure 7:
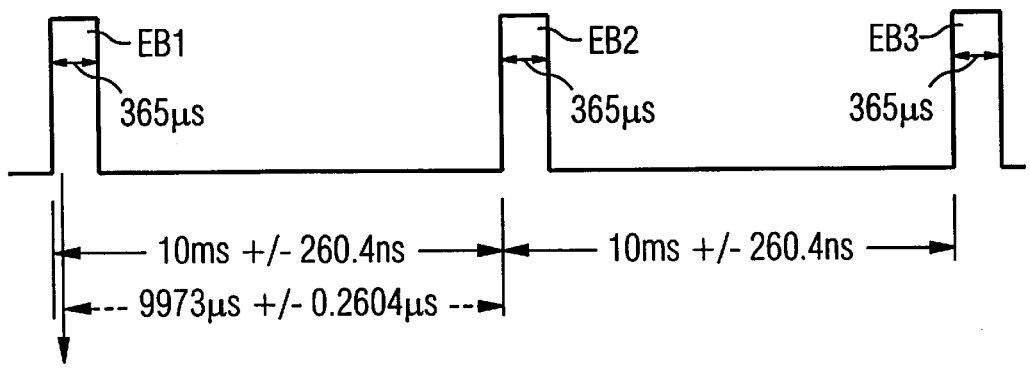
FIG. 7 shows the chronological sequence of a plurality of DECT bursts occurring in the DECT time division multiple access frame.

FIG. 7 shows the chronological sequence, related to time slots, of a plurality of reception bursts EB1, EB2, EB3, which are received by the base station of the DECT cordless telephone in a plurality of time division multiple access frames and originate from corresponding transmission bursts transmitted by the mobile section of the DECT cordless telephone. In the active connection state (communication state) between a radio transmitting arrangement (in this case: mobile section of the DECT cordless telephone) and a radio receiving arrangement (in this case: base station of the DECT cordless telephone), a burst with a length of about 365 $\mu$s is transmitted in time slots every 10 ms in accordance with the statements relating to FIG. 1. During the time in which there is no connection and which has a time duration of about 9635 $\mu$s (quiescent state), the clock frequencies emitted by corresponding timers in the mobile section and the base station can drift in time with respect to one another by a maximum of ⅓ bit. For a bit transmission time of 868 ns, this time drift corresponds to a time interval of 260.4 ns.

Because of this time drift, which is specific to cordless telephones, the first antenna diversity control signal SS1 can also be generated only with a time uncertainty of 260.4 ns with respect to a reference signal. A synchronization signal SDS, which is called Sync Detect Signal, is available, for example as the reference signal in this case, which synchronization signal SDS occurs regularly in each time slot with a time error of 0.264 μs and by means of which the time slot-related synchronization is initiated. The time interval between the time slot-related synchronization signal SDS and the start of the next time slot is about 9973 μs. This time interval of 9973 μs is used as the time reference variable for the measures which are required in conjunction with the "antenna diversity" to be improved. Thus, for example, if the base station has received an n-th reception burst in an n-th (for example the first, where n=1) time slot with an n-th synchronization signal as the reference signal for the antenna diversity control signal SS1, the time t1 for the first field strength measurement FSM1 occurs 9973 μs later in an (n+1)-th (second) time slot.

Defining the time t1 in this way also unambiguously defines the times t2, t3. This also applies in the same way to other times t4, t5, t5' according to FIG. 6 which are related to the improvement of the "antenna diversity".

Until a fourth time t4, the field strength readings resulting from the two field strength measurements FSM1, FSM2 are compared and a comparison result is defined as a function of them. If a fourth antenna diversity control signal SS4 confirms on the basis of the comparison result that the second reading resulting from the second field strength measurement FSM2 is less than the first reading resulting from the first field strength measurement FSM1, then the system switches back to the antenna A1 (repeated antenna change) at a fifth time t5. This antenna change is complete at a time t5'. As a result of the start of the antenna change at the time t5, for example during the twelfth bit (a low bit according to FIG. 6) in the synchronization initiation word B-SEW at the receiving end, a second interference pulse SI2 is produced, which can interfere with the corresponding bit. The two interference pulses SI1, SI2 which are caused by the respective antenna change in general have no direct effect on the identification of the "1/0" or "0/1" alternation in the bit sequence in the synchronization initiation word E-SEW at the receiving end. It can therefore be assumed, with a certain probability, that (1) the alternation in the bit sequence can be identified even without the two bits which are subject to interference, and
(2) if the alternation in the bit sequence is not identified, there is also a certain probability of these bits together with the two bits which are possibly not subject to interference being identified, and loss of the reception burst would thus have been prevented.

Figure 4:
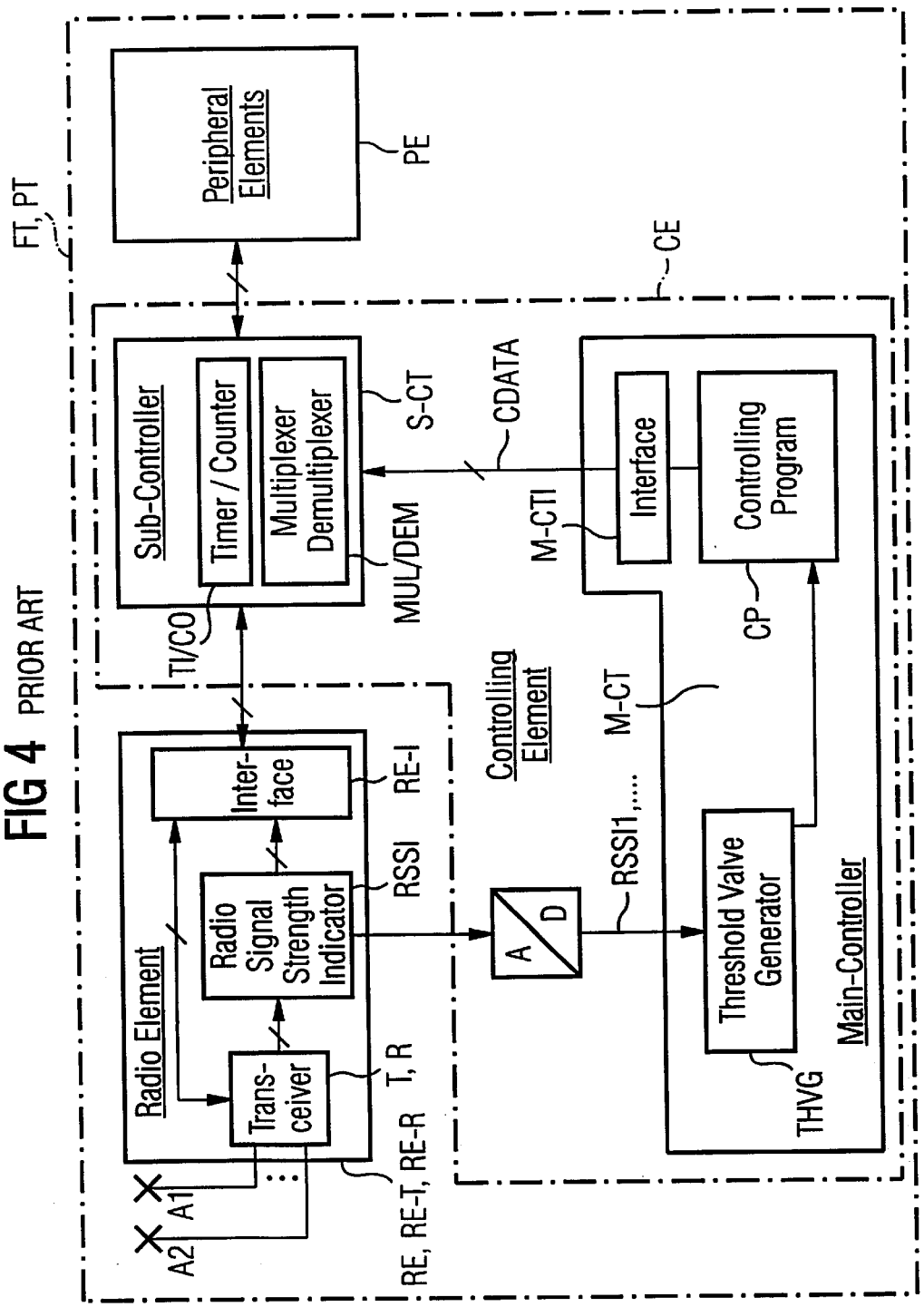
Figure 5:
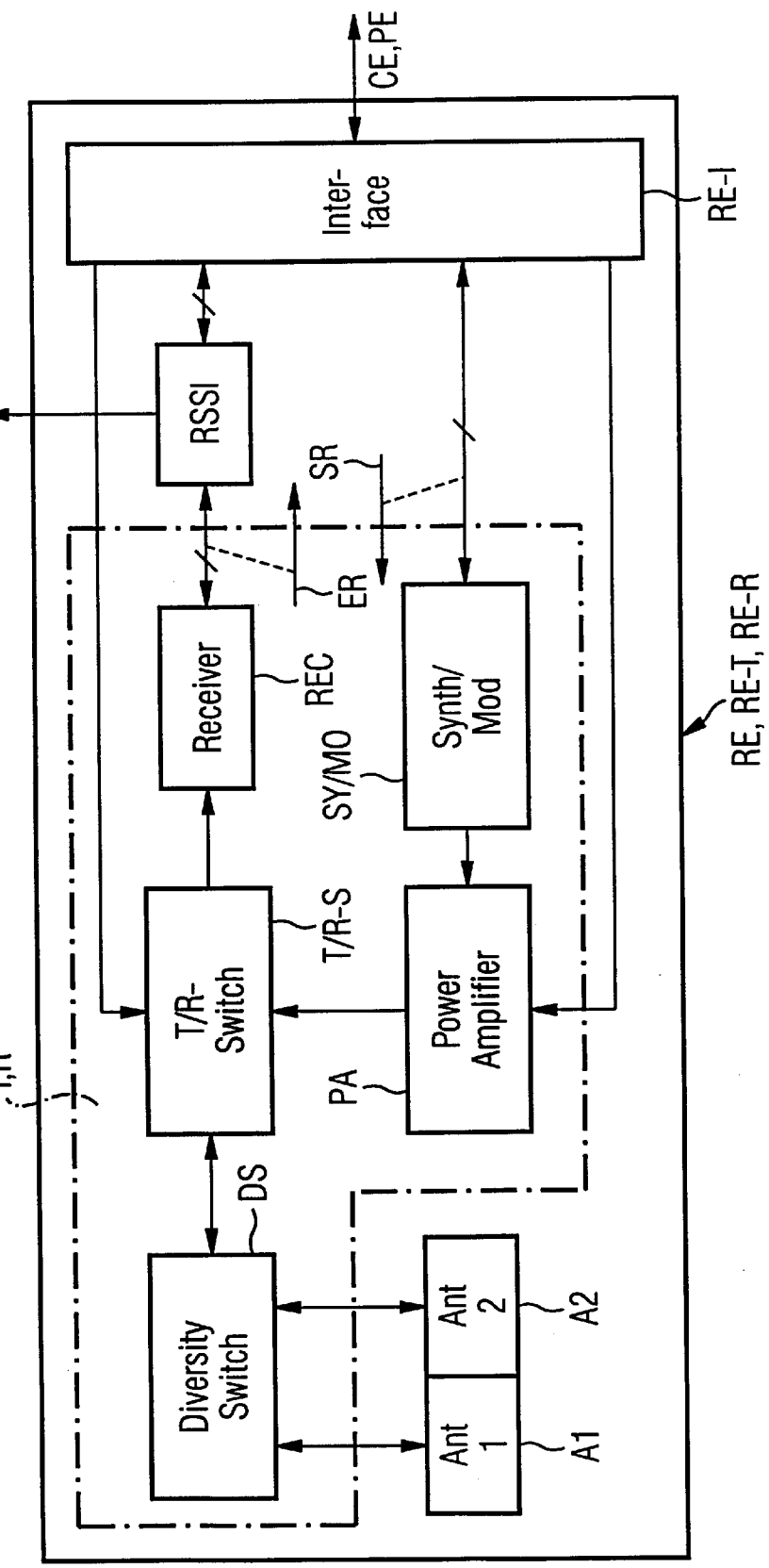
Figure 8:
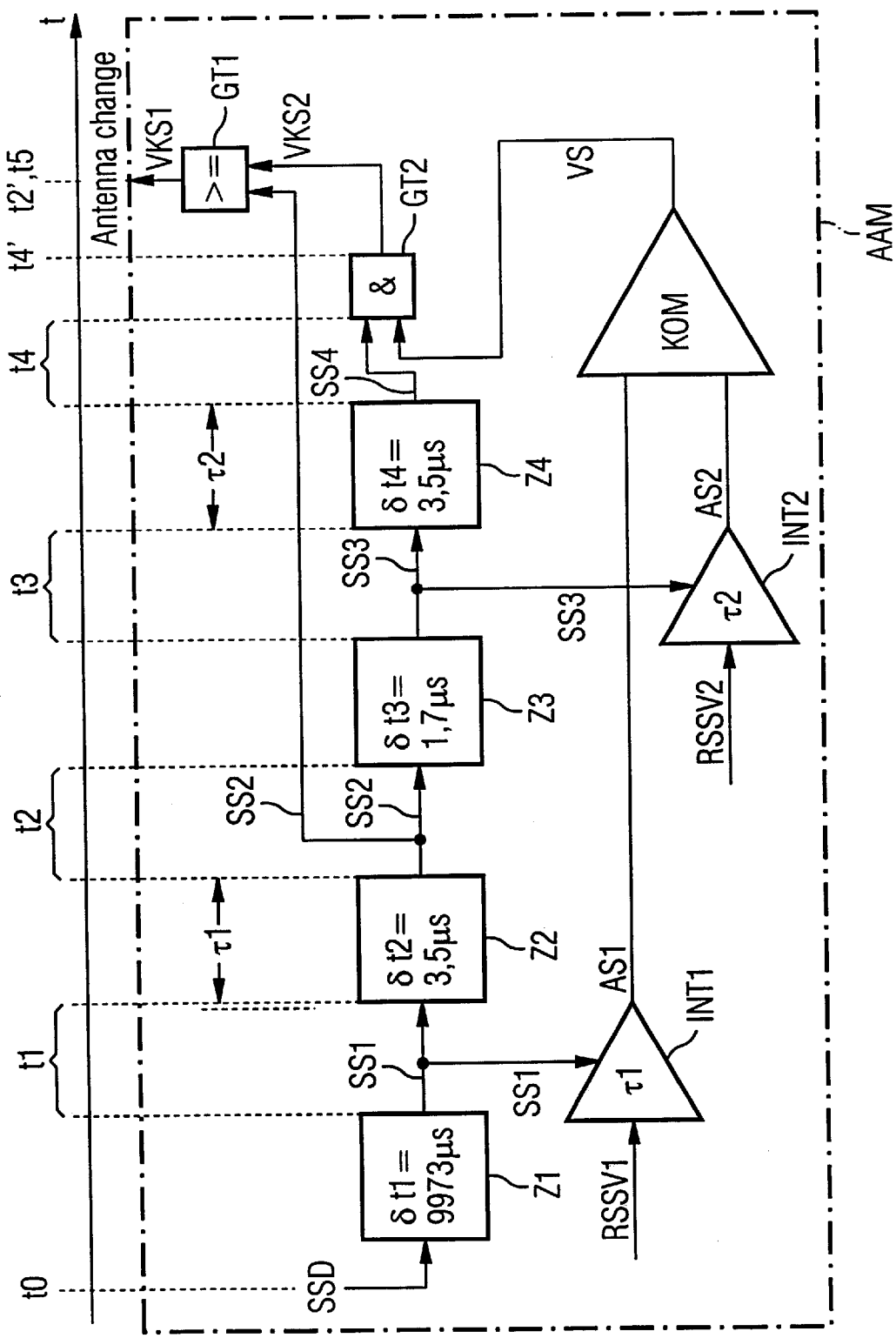
FIG. 8 depicts an antenna selection means for carrying out the antenna change using a plurality of series-connected counters which substantially produce the antenna diversity control signals with respect to the synchronization signal.

FIG. 8 shows antenna selection means AAM by means of which the method steps for carrying out the antenna change, which are described in FIG. 6, can be carried out. The antenna selection means AAM according to the illustration in FIG. 8 preferably comprises an arrangement of electronic circuits. This antenna selection means AAM or circuit arrangement is assigned to antenna diversity means RE, RE-T, RE-R, DS, RSSI, A/D, M-CT of the antenna diversity radio transmitting arrangement and radio receiving arrangement FT, PT according to FIGS. 4 and 5. As an alternative to the electronic circuit arrangement, the antenna selection means may also be formed as program modules, provided it is possible using these means to determine quickly enough the antenna selection criterion—the field strength in the present exemplary embodiment. The identification/non-identification of a TDMA-specific signal sequence in the radio message (in this case: the "1/0" signal sequence in the synchronization initiation word E-SEW at the receiving end) could be used, for example, as a further selection criterion.

The antenna selection means AAM has a plurality of series-connected counters Z1 . . . Z4 which essentially produce the antenna diversity control signals SS1 . . . SS4 with respect to the synchronization signal SSD (Sync Detect Signal). The use of counters is possible in particular because all the time intervals which result from the time differences between the times t1. . . t5' and a time t0 (when the synchronization signal SSD occurs) can be derived from the bit clock rate of 1.152 MHz. A first counter Z1 is controlled on the input side at the time to by the synchronization signal SSD.

By counting cime units which correspond to the bit clock rate, the counter Z1 in this case detects a first time interval δt1, which is obtained from the time interval between the times t1, t0. This time interval δt1 is—according to the statements relating to FIGS. 6 and 7—9973 μs. After the detection of the time interval δt1, the counter Z1 emits the first antenna diversity control signal SS1 at the time t1 to the input of a second counter Z2 and to a control input of a first integrator INT1. The second counter Z2 and the first integrator INT1 are activated by the first control signal SS1.

By counting time units which correspond to the bit clock rate, the second counter Z2 in this case detects a second time interval δt2, which is obtained from the time interval between the times t2, t1. In the present exemplary embodiment, this time interval δt2 is about 3.5 μs. During this time interval δt2, which corresponds to the measurement time period τ1, the first field strength measurement FSM1 is carried out at the integrator INT1. During this measurement, first field strength values RSSV1 (Radio Signal Strength Values), which are supplied on the input side to the integrator INT1 during the measurement time period τ1, are integrated to form a first output signal AS1.

After the second time interval at2 and the measurement time period τ1 have elapsed, the second antenna diversity control signal SS2 is supplied at the time t2 on the input side to a third counter Z3 and to a an OR gate GT1. An OR logic signal VKS1 is produced at the gate GT1 by the control signal SS2, and the antenna change from the first antenna A1 to the second antenna A2 takes place as a result of this signal at the time t2' (governed by the gate delay time at the OR gate GT1). Furthermore, the third counter Z3 is activated by the control signal SS2 so that, by counting time units which correspond to the bit clock rate, this third counter Z3 detects a third time interval δt3. This time interval δt3, which indicates the time interval between the times t3, t2, is 1.7 μs in the present exemplary embodiment.

After detecting this time interval δt3, the third antenna diversity control signal SS3 is produced by the third counter Z3 at the time t3, is supplied on the input side to a fourth counter Z4 and is passed to a control input of a second integrator INT2. The counter Z4 and the integrator INT2 are activated by the control signal SS3. Following activation, by counting time units which correspond to the bit clock rate, the counter Z4 detects a fourth time interval δt4, which is obtained from the time interval between the times t4, t3. Like the time interval δt2, the time interval δt4 is 3.5 μs long. The time interval δt4 corresponds, furthermore, to the second measurement time period τ2 illustrated in FIG. 6. In this measurement time period τ2, second field strength values RSSV2 which are applied to the input of the integrator INT2 are integrated to form a second output signal AS2.

At the time t4, the fourth counter Z4 emits a fourth antenna diversity control signal SS4 to an AND gate GT2. In addition, until this time t4, a comparison is carried out between the two output signals AS1, AS2. To do this, these output signals are supplied to a comparator KOM which produces a comparison signal VS from these two output signals AS1, AS2. This comparison signal VS is likewise supplied to the AND gate GT2. The AND gate GT2 forms an AND logic signal VKS2 from the control signal SS4 and the comparison signal VS, which AND logic signal VKS2 is supplied at a time t4' (governed by the gate delay time at the AND gate GT2) to the OR gate GT1. The control signal SS2 and the AND logic signal VKS2 are logically combined in the OR gate GT1. The OR logic signal VKS1 produced in the process results in the system switching back from the second antenna A2 to the first antenna A1 at the time T5, irrespective of the control signal SS2, because the field strength measurements FSM1, FSM2 have shown that the reception on the first antenna A1 is better than that on the second antenna A2.

Since a DECT base station operates simultaneously with a plurality of mobile sections (up to 12 mobile sections which all drift differently to the base station with respect to time), the complexity for generating the first antenna diversity control signal SS1 increases in such a manner that a dedicated first counter has to be provided for each individual mobile section. An appropriate design of the antenna selection means for this purpose is shown on the basis of FIG. 8 and FIG. 9, where the individual counters Z1.1 ... Z1.12 relating to the mobile section are connected on the output side, for example, to a further OR gate GT3.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An antenna diversity radio receiving arrangement for telecommunications systems using block-oriented transmission of radio messages, comprising:

antenna diversity system having a plurality of antennas, the plurality of antennas being structured such that
   a) at least two different antennas of the plurality of antennas allocated to the antenna diversity system are allocated in alternation to a reception channel of the antenna diversity radio receiving arrangement as reception antenna during a reception time span of a synchronization preamble word that contains redundant data and belongs to a synchronization field contained in a message block of the radio message and that is composed of the synchronization preamble word and a synchronization confirmation word;
   b) of the plurality of antennas allocated to the reception channel during the reception time span of the synchronization preamble word; an antenna having a best reception characteristic for the reception time span of the message block is allocated to the reception channel.

2. The antenna diversity radio receiving device as claimed in claim 1 wherein the radio message is a TDMA radio message.

3. The antenna diversity radio receiving device as claimed in claim 1 wherein the radio message is a CDMA radio message.

4. The antenna diversity radio receiving device as claim in claim 1, wherein the antenna diversity system has a antenna selection device which is structured such that antenna selection is carried out by field strength measurements.

5. The antenna diversity radio receiving device as claimed in claim 4, wherein the antenna selection device has a comparator to which voltage values corresponding to measured field strength values of the field strength are supplied.

6. The antenna diversity radio receiving device as claimed in claim 2, wherein the antenna selection system is structured such that antenna selection is carried out by identification/non-identification of a TDMA-specific signal sequence in the radio message.

7. The antenna diversity radio receiving device as claimed in claim 6, wherein the TDMA-specific signal sequence is a "1/0" signal sequence.

8. The antenna diversity radio receiving device as claimed in claim 4, wherein the antenna selection system is structured such that antenna selection is carried out by identification/non-identification of a TDMA-specific signal sequence in the radio message.

9. The antenna diversity radio receiving device as claimed in claim 8, wherein the TDMA-specific signal sequence is a "1/0" signal sequence.

10. A method for selecting antennas in an antenna diversity radio receiving arrangement for telecommunication systems using block-oriented transmission of radio messages, comprising the steps of:

a) allocating at least two different antennas in alternation to a reception channel of the antenna diversity radio receiving arrangement as reception antenna during a reception time span of a synchronization preamble word that contains redundant data and belongs to a synchronization field contained in a message block of a radio message and composed of the synchronization preamble word and a synchronization confirmation word;
    b) allocating to the reception channel an antenna of the at least two different antennas, allocated to the reception channel during the reception time span of the synchronization preamble word, having a best reception characteristic for the reception time span of the message block.

11. The antenna diversity radio receiving device as claimed in claim 2, wherein the message block is a DECT-specific message block.

12. The antenna diversity radio receiving device as claimed in claim 4, wherein the message block is a DECT-specific message block.

* * * * *